United States Patent [19]

Heys, Jr. et al.

[11] Patent Number: 4,841,412

[45] Date of Patent: Jun. 20, 1989

[54] ELECTRONIC APPARATUS ASSEMBLY

[75] Inventors: George Heys, Jr.; Andrew E. Yandora; Philip D. McDowell, all of Cambridge, Ohio

[73] Assignee: NCR Corporation, Dayton, Ohio

[21] Appl. No.: 212,839

[22] Filed: Jun. 29, 1988

[51] Int. Cl.⁴ .................................. G06F 1/00
[52] U.S. Cl. ..................... 361/393; 364/708; 340/711; 312/208; 235/145 R; 361/380
[58] Field of Search ................ 235/419, 483, 145 R; 307/149, 150; 340/711, 712, 365 R; 364/708, 709.01, 706, 900; 200/5 R, 5 A; 361/380, 383, 390, 392–396, 399, 428, 429; 312/208, 223

[56] References Cited

U.S. PATENT DOCUMENTS

| | | | |
|---|---|---|---|
| 3,480,945 | 11/1969 | Nelson | 364/709.01 |
| 4,323,979 | 4/1982 | Johnston | 364/708 |
| 4,333,155 | 6/1982 | Johnston | 364/708 |
| 4,479,198 | 10/1984 | Romano et al. | 364/900 |
| 4,533,791 | 8/1985 | Read | 235/145 R |
| 4,602,164 | 7/1986 | Gore | 361/393 |
| 4,636,781 | 1/1987 | Wills | 361/390 |
| 4,669,053 | 5/1987 | Krenz | 364/708 |
| 4,698,782 | 10/1987 | Ng | 364/708 |
| 4,723,319 | 2/1988 | Mizzi et al. | 361/393 |

Primary Examiner—Gerald P. Tolin
Attorney, Agent, or Firm—Wilbert Hawk, Jr.; Albert L. Sessler, Jr.

[57] ABSTRACT

An electronic terminal device is fabricated so as to be quickly and easily assembled and disassembled by use of housing parts and internal parts having snap-type fasteners. Separate fasteners such as screws are not needed. Special tools are not required for assembly and disassembly of the device. Performance of repair and maintenance functions by purchasers of the equipment is thus facilitated.

21 Claims, 8 Drawing Sheets

ELECTRONIC APPARATUS ASSEMBLY

CROSS REFERENCE TO RELATED APPLICATIONS

The subject matter of this application is related to the subject matter of the following copending United States patent applications:

Passive Strain Relief Apparatus, NCR Docket No. 4192, filed on even date herewith, now U.S. Ser. No. 213,066, inventors George Heys, Jr., Andrew E. Yandora and Philip D. McDowell, assigned to NCR Corporation; and Data Processing Terminal With Removable Keyboard Module, NCR Docket No. 4196, filed on even date herewith now U.S. Ser. No. 213,080, inventors George Heys, Jr., Andrew E. Yandora and Philip D. McDowell, assigned to NCR Corporation.

BACKGROUND OF THE INVENTION

In electronic apparatus such as point of sale or financial terminals, it is desirable to provide cabinet or housing structures which are readily assembled and disassembled, and which do not require fasteners such as screws which are separate elements and thus susceptible to loss, and which require a substantial amount of time to install and remove. Simplified assembly reduces costs both in initial assembly and in subsequent maintenance. Also simplicity in assembly and disassembly facilitates service and maintenance of the terminal by the purchaser or user, thus lessening the need for professional and relatively expensive servicing personnel, which is a substantial advantage to the purchaser or user of the terminal.

SUMMARY OF THE INVENTION

This invention relates to an electronic apparatus assembly, and more particularly relates to an assembly for an electronic apparatus such as a data processing terminal in which assembly is facilitated by using fasteners which do not require special tools for assembly and disassembly, and which are simple to operate.

In accordance with one embodiment of the invention, an electronic terminal device comprises a combined base and wall structure for said terminal device, said wall structure including two side walls, a front wall and a rear wall, said side walls each having an inclined portion extending upwardly from said front wall to a point and a horizontal portion extending from said point to said rear wall; a top member positioned on the horizontal portions of the side walls and on the rear wall when the terminal device is assembled; a keyboard module positioned over the inclined portions of the side walls and over the front wall when the terminal device is assembled; a power supply having a housing positioned on said base within said terminal adjacent said rear wall; an electronics assembly positioned within said terminal adjacent said power supply and provided with a plurality of extensions to engage apertures in the housing of said power supply to retain said electronics assembly and said power supply in position and to provide electrical connection between said power supply and said electronics assembly; and resilient securing means for releasably retaining said electronics assembly in position on said base within said terminal device.

It is accordingly an object of the present invention to provide an electronic apparatus assembly which is relatively easy to assemble and disassemble.

Another object is to provide an electronic apparatus assembly requiring a relatively small number of fasteners of readily operable design.

Another object is to provide an electronic apparatus assembly having an external housing of snap-together design.

Another object is to provide an electronic apparatus assembly in which major internal electronic components are held in position by snap action fastening means.

With these and other objects, which will become apparent from the following description, in view, the invention includes certain novel features and combinations of parts, a preferred form or embodiment of which is hereinafter described with reference to the drawings which accompany and form a part of this specification.

DESCRIPTION OF THE PREFERRED EMBODIMENTS

Figure 1:
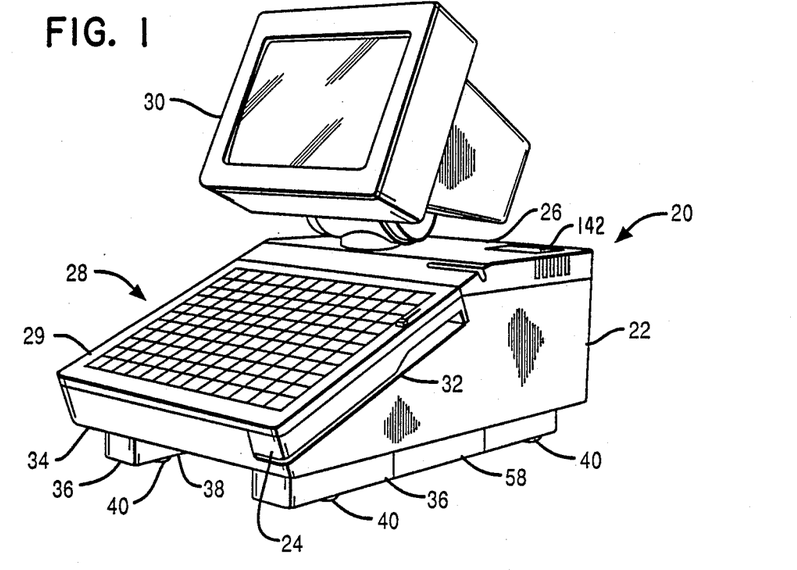
FIG. 1 is a perspective view of a terminal embodying the present invention and utilizing one type of display.

Referring now to FIG. 1, shown there is an assembled terminal 20, which includes a housing 22, a side piece 24, a top 26, a keyboard module 28 and a display 30. A bezel 29 forms part of the keyboard module 28. The side piece 24 has a slot 32 therein for introduction into the terminal 20 of magnetically encoded record media to be read by a magnetic stripe reader, and is removable from the remainder of the housing 22 so that it may be replaced, when necessary, with a side piece of different design in the event that no stripe reader or a different type of reader or other device is to be used in the terminal 20. The side piece 24 may be considered to be a part of the side wall structure of the terminal housing from a functional and structural standpoint. The housing 22 is formed integrally with a base 34 which includes two parallel downwardly-extending legs 36 which define a central tunnel 38, through which electrical cables for the terminal 20 may extend. Two feet 40 may be provided on each of the legs 36. The housing 22 including the base 34, the side piece 24, the top 26 and portions of the keyboard module 28 and the display 30 may be made from a suitable plastic material having a degree of resiliency which is useful in such parts as snaps and latches. A suitable plastic material is polyphenylene oxide, which is sold under the name of Noryl by General Electric Company.

Figure 2:
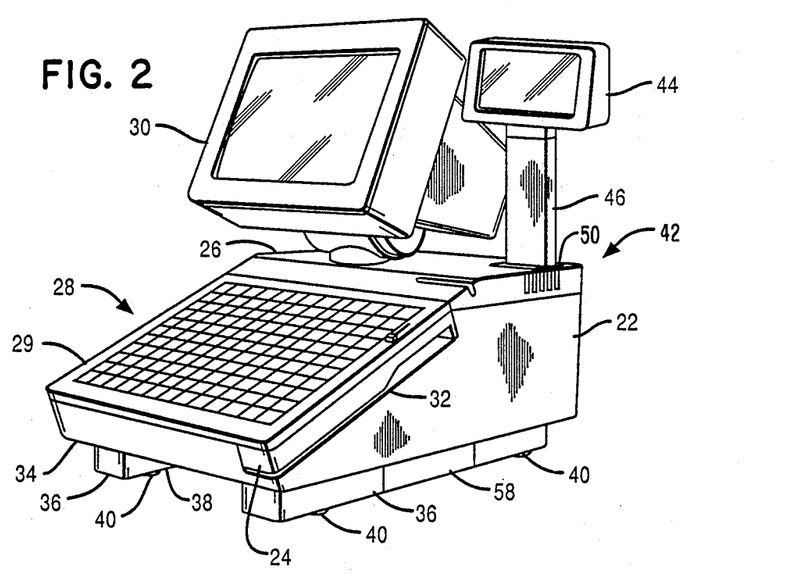
FIG. 2 is a perspective view of a terminal embodying the present invention and utilizing a second type of display, in addition to the display shown in FIG. 1.

The terminal 42 shown in FIG. 2 is similar to the terminal 20 of FIG. 1, with the same reference characters being used for identical parts, except that an additional display 44 is provided, and is mounted on a post 46, which in turn is located in an aperture in a plate 50 in the top 26.

Figure 3:
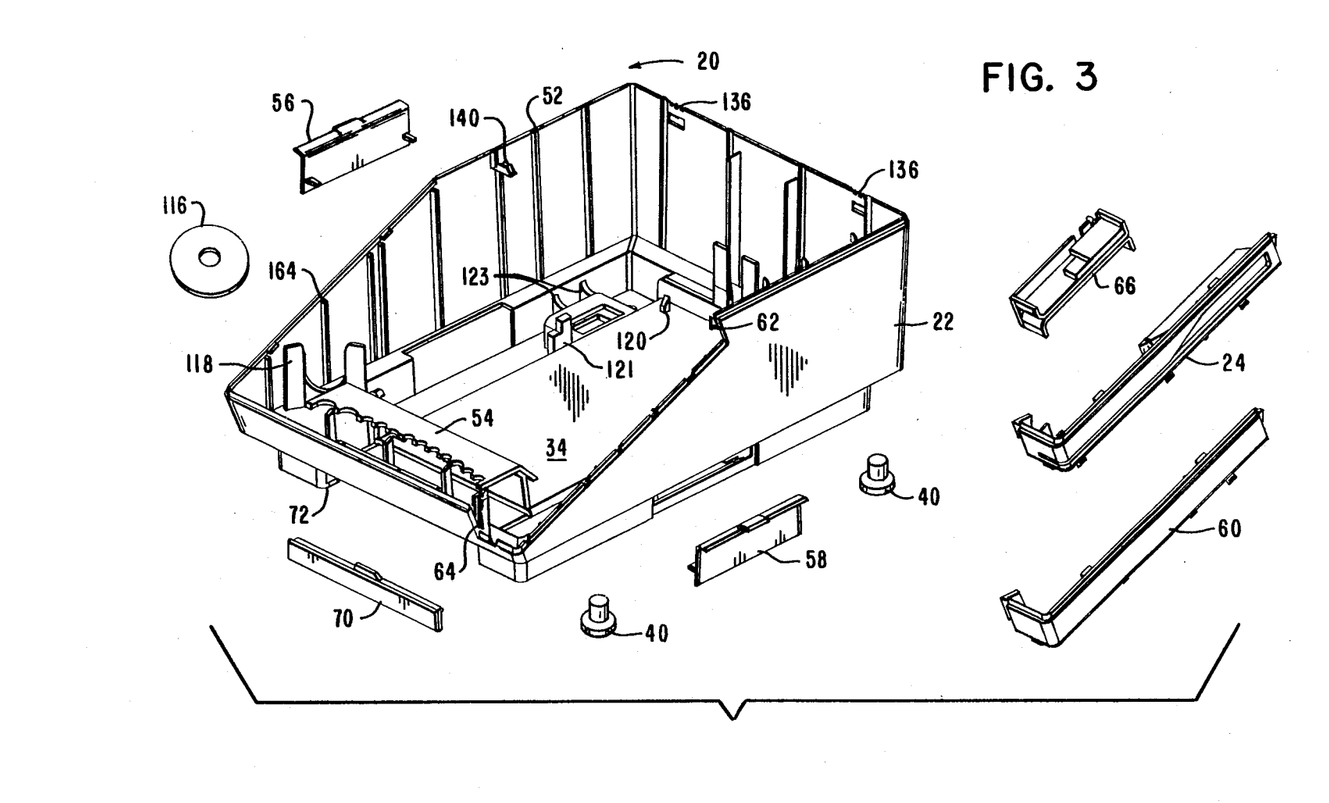
FIG. 3 is an exploded perspective view of the terminal housing, showing the interior thereof, and various removable elements.

The housing 22 is shown in FIG. 3 with the side piece 24, the top 26, the keyboard module 28 and the display 30 removed. Also the internal contents of the terminal 20 have been removed so that the upper surface of the base 34 is visible. On its inside walls, the housing 22 includes vertical reinforcing elements 52, as well as various other structural features which will be subsequently described in connection with the description of various other parts of the assembly which are secured in position with the aid of these structural features. Several elements of the terminal 20 are shown separately from the housing 22, and are attached to the housing 22 as part of the assembly operation. A cable strain relief element 54 is assembled onto the base 34 at an early stage in the assembly, but is not described herein in detail because it is the subject of the previously referenced copending U.S. patent application Ser. No. 213,066.

After assembly of the strain relief element onto the base 34, four rubber feet 40 are inserted from the bottom of the base 34 and pulled through with pliers until they snap into place.

Printer access door 56 and test access door 58 are snapped into the base 34. When an integrated printer for the terminal is required, the printer access door 56 is removed, providing cable access to the internal electronics of the terminal 20. During automated testing in the factory, or during field testing, the test access door 58 is removed to allow access to the internal electronics of the terminal 20.

If a magnetic stripe reader is not to be included as a component of the terminal 20, the magnetic stripe reader blank wall 60 is inserted into slots 62 and 64 and snapped into the base 34. If a magnetic stripe reader 66 is included in the terminal, said reader 66 and its wall 68 are installed in the base 34 in place of the blank wall 60.

A cable cover 70 is inserted into grooves 72 and is snapped into the base 34.

Figure 4:
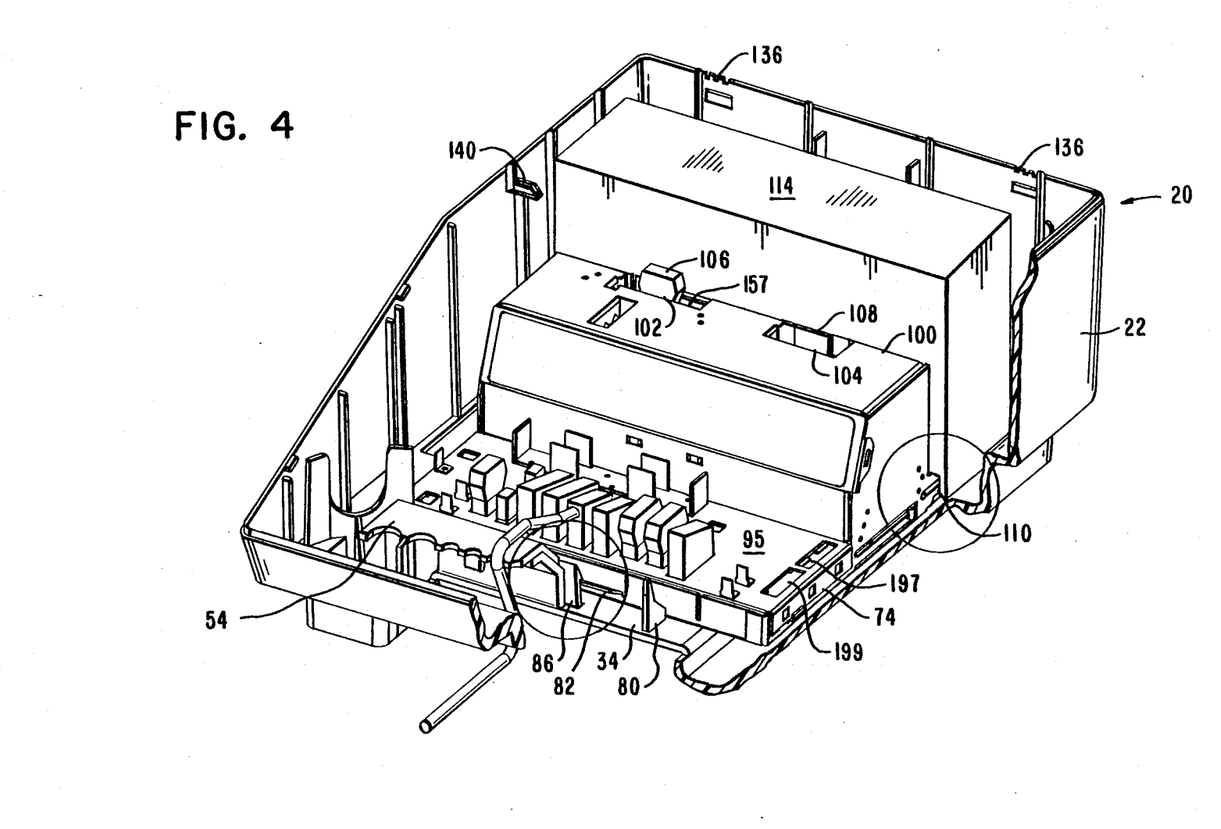
FIG. 4 is a perspective view similar to FIG. 3, but showing electronic components placed in position in the interior of the terminal.

The power supply 114 is next installed and is dropped into place on the base 34 so that its rear wall is positioned just forward of two guides 120 and its front wall is positioned just back of two guides 121. Side ribs 123 restrict lateral movement of the power supply 114.

Figure 7:
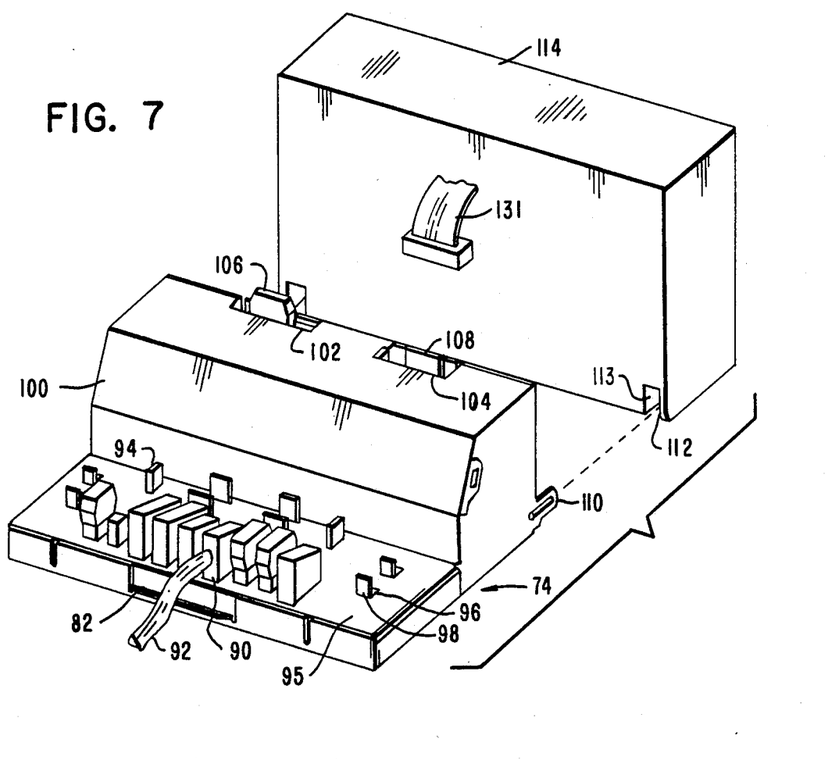
FIG. 7 is a perspective view of the electronics assembly and the power supply in disassembled relationship.

As shown in FIG. 7, an electronics assembly 74 includes a flat forward portion 95 having a plurality of input-output connectors 90 to which cables such as the cable 92 may be connected. A battery holder 94 may be provided on the flat portion 95 to hold a battery for furnishing memory back-up power in the event of failure of external power. Ground tabs 98 are secured to the flat portion 95 of the assembly 74 by feet 96. A protective metal housing enclosure 100 for electronic components contains apertures 102 and 104 through which connectors 106 and 108 extend to provide connections to the display 30 and the keyboard 28, respectively. Extending outwardly from the rear of the assembly 74 on each side are a pair of extensions or ears 110.

Figure 5:
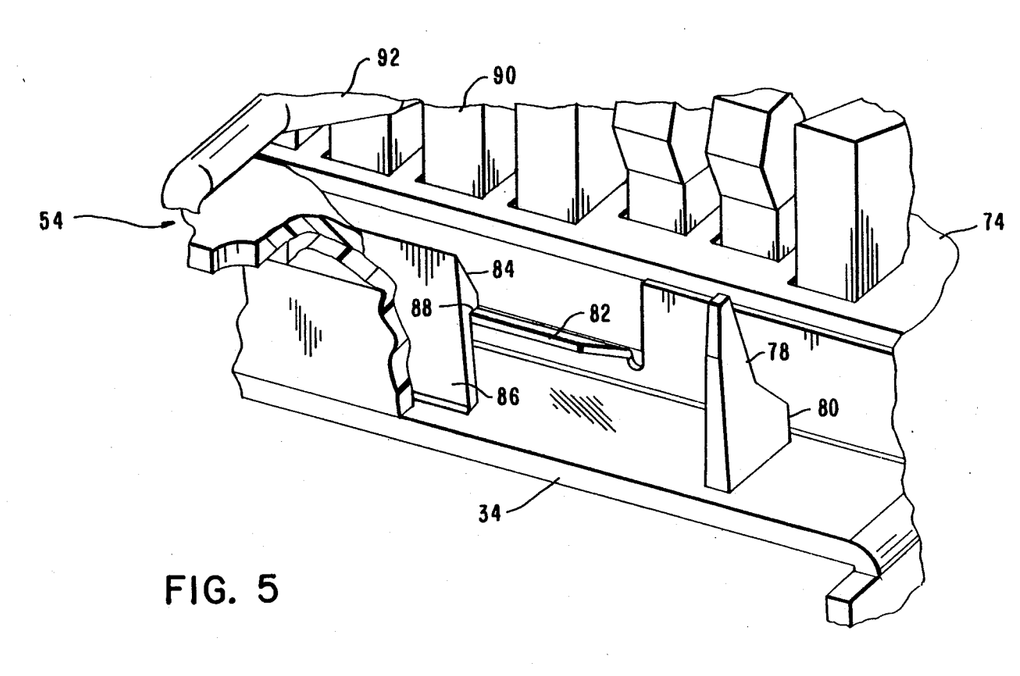
FIG. 5 is a fragmentary detail view of a portion of the electronics assembly comprising an angled edge portion which engages with a retaining latch in the terminal base.
Figure 6:
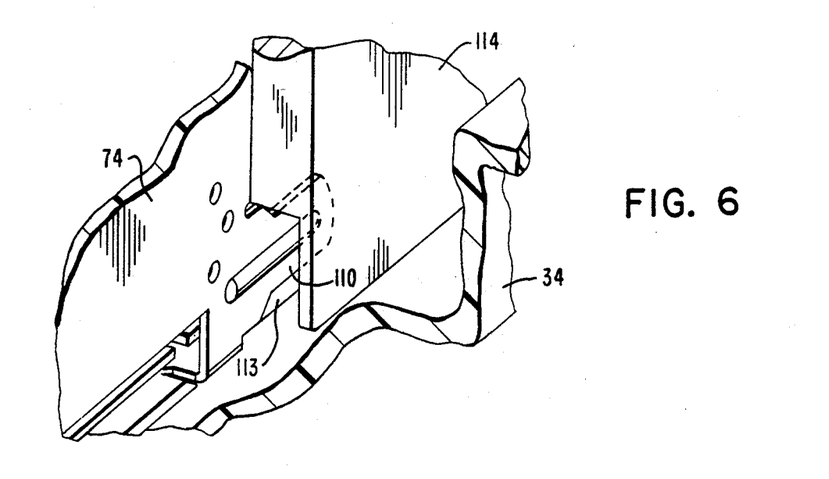
FIG. 6 is a fragmentary detail view of an extension of the electronics assembly which engages a surface of the power supply.

The electronics assembly 74 is assembled in the housing 22 by placing the ears 110 through apertures 112 in the front wall of the power supply 114, where they engage internal beryllium tabs 113 in said power supply to provide grounding connections. The forward end of the electronics assembly 74 is then rotated downwardly and guided into position by cam surfaces 78 on guide members 80 formed integrally with the base 34, as shown in the detail view of FIG. 5. As the forward edge of the electronics assembly 74 moves downwardly, an angled portion 82 thereon engages an inclined surface 84 on a latch 86 which may be formed integrally with the base 34, and which is sufficiently resilient to be rocked out of position by said portion 82. As the angled portion 82 moves to its lowest position, the latch 84 is free to return to its original position. A retaining horizontal surface 88 on the latch 86 now overlies the portion 82 and thus retains the electronics assembly 74 in position on the base 34.

A speaker 116 for providing audible signals in connection with operation of the terminal 20 is installed by inserting it into a speaker mount 118 and plugging it into the electronics assembly 74.

With the electronics assembly 74 and the power supply 114 installed in the interior of the terminal 20, the top 26 is next assembled to the housing 22.

Figure 9:
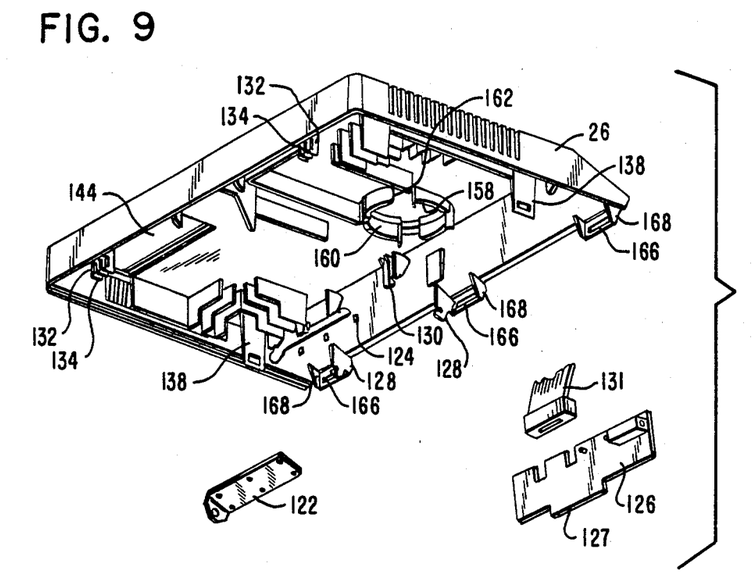
FIG. 9 is a perspective exploded view of the underside of the terminal top and the lens element which is assembled to the top.

As may best be seen in FIG. 9, a sub-assembly comprising the top 26 is created by locating a lens 122, which enables the reading of record media which is maintained within the terminal 20, over a plurality of heat stake posts 124 of the top 26 and heat staking the lens into position. The control panel board 126 is then installed by inserting its front edge into hooks 128 and rotating said panel into engagement with snaps 130. The control panel board harness 131 is connected between an edge of the connector on the control panel connector board 126 and the connector 108.

Figure 8:
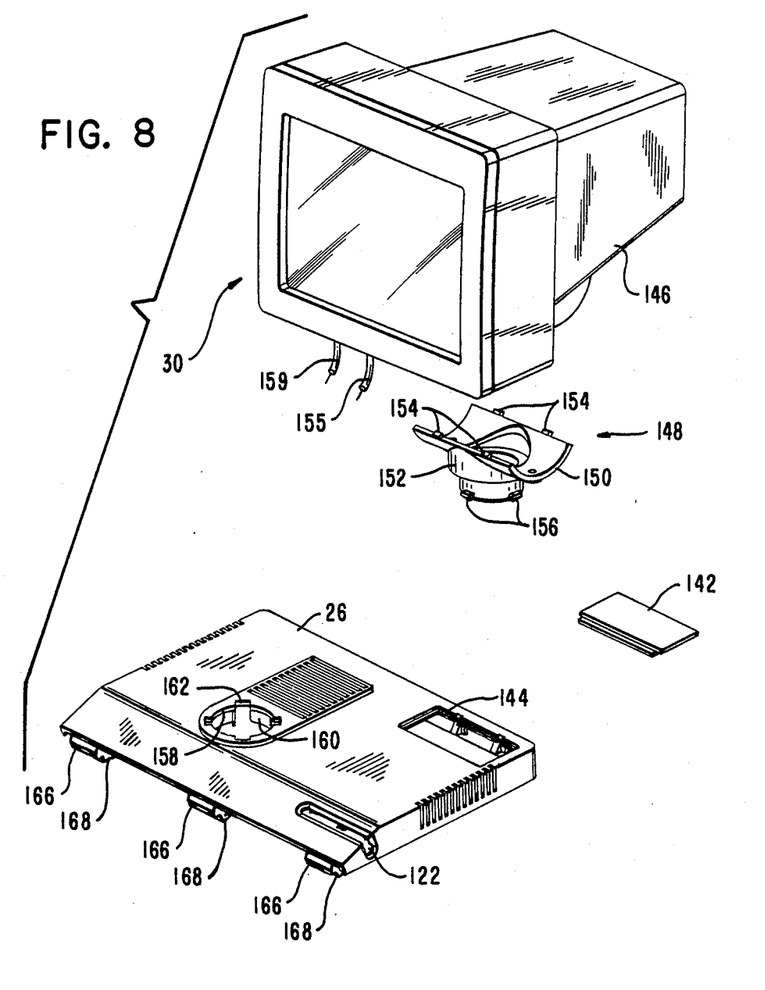
FIG. 8 is a perspective exploded view of the top of the terminal, an access plate for the top, a display for the terminal, and a support for the display which is mounted in the terminal.

The top 26 is assembled to the housing 22 by aligning the louvers 132 on the top rear hooks 134 with the top rear slots 136 on the base 34. This provides a hinge-like connection between the top 26 and the housing 22. The top 26 is then rotated downwardly until top lock tabs 138 on the underside of the top 26 snap over lock tabs 140 on the housing 22. A blank door 142 is snapped into a corresponding aperture 144 in the top 26. This door is replaced with an apertured door when a customer display is installed on the terminal 20, as will subsequently be described in greater detail.

The display 30 comprises a CRT (cathode ray tube) 146 and a mount 148 for said CRT. The mount 148 includes a curved bracket 150 and a tubular portion 152. On the bracket 150 are a plurality of tabs 154 which snap into corresponding apertures (not shown) on the bottom of the CRT. At the bottom of the tubular portion 152, and at a forty-five degree angle from the tabs 154, are four locking lugs 156. A display cable 155 and a coaxial cable 159 extend from the CRT 146 through the mount 148. The display 30 is installed on the top 26 by first inserting the display cable 155 and the coaxial cable 159 through a display mounting aperture 158 in the top 26. An annular detent 160 extends downwardly from the circumference of the aperture 158 and is divided into four parts by four slots 162 which are dimensioned and located to receive the lugs 156. The display is positioned with the lugs 156 aligned with the slots 162 and is lowered until the bracket 150 engages the top 26. The display is then rotated forty-five degrees clockwise as viewed in FIG. 8 to lock the display 30 in position on the top 26. The display cable 155 is plugged into the connector 106 and the coaxial cable 159 is plugged into a connector 157 next to the connector 106. Circuit modules which are located inside the enclosure 100 are plugged in at this time.

The keyboard module 28 is next installed by aligning keyboard slots (not shown) over keyboard locking tabs (not shown) and letting the keyboard seat on keyboard support ribs 164. The keyboard module is then moved upwardly and to the rear along the inclined upper surfaces of the housing 22 and the side piece 26 until a connector (not shown) on the keyboard module 28 engages a mating connector 127 on board 126 in the terminal, and tabs (not shown) on the keyboard module engage slots 166 in downwardly extending projections 168 of the top 28. In addition to a keyboard structure, the keyboard module 28 includes a caption sheet (not shown), a transparent overlay (not shown), and the bezel 29 which holds the caption sheet, the overlay and the keyboard in place. The keyboard module 28, and its connection to the remainder of the terminal 20, are the subject of the separate copending application Ser. No. 213,080, to which reference may be had for further explanation, and consequently a detailed description is not included in the present application.

Figure 10:
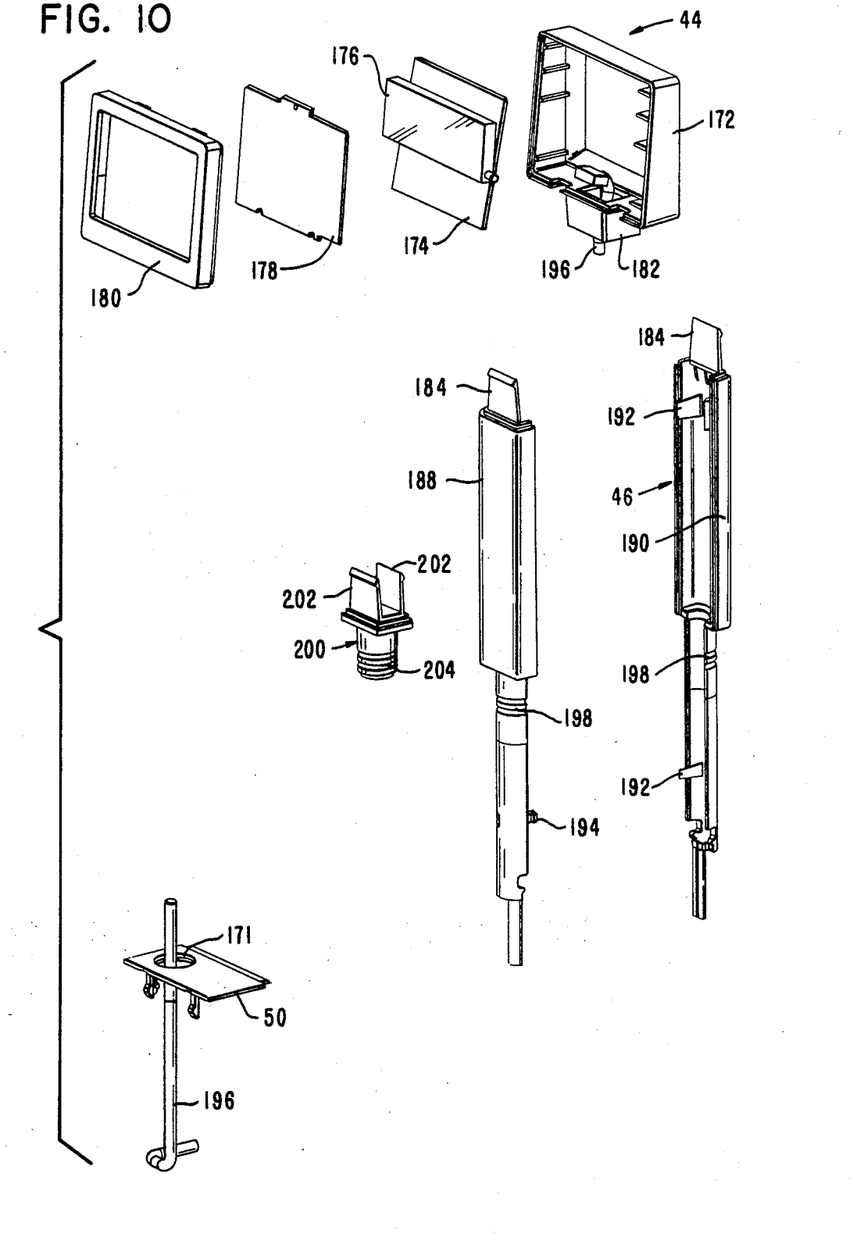
FIG. 10 is an exploded perspective view of an additional customer display which is mounted in the top of the terminal.

Shown in FIG. 10 is an exploded view of the customer display 44, which may be added to the terminal 20 in addition to the display 30. When the customer display 44 is to be installed, the blank plate 142 (FIG. 8) is removed from the top 26 and is replaced by the apertured customer display plate 50 which snaps into the aperture 144 in the top 26. The plate 50 contains an aperture 171, which includes a threaded internal circumference.

The customer display 44 comprises a display housing 172 which receives a customer display circuit board 174, a display panel 176, and a display lens 178. A display bezel 180 fits over the assembled elements 174, 176 and 178 and retains them in position within the housing 172. A base 182 secured to the bottom of the housing 172 receives two oppositely disposed tongues 184 of the display post shown generally as 46 which comprises two similar elements 188 and 190 which are snapped together by complementary fasteners 192 and 194. A cable 196 extends through the assembled post 46 into the housing 22 of the terminal 20. In assembly, the lower end of the post 46 is inserted into the aperture 171 of the plate 50, and a threaded portion 198 of the post 186 engages the threaded internal circumference of the aperture 171, to retain the post 46 and the display 44 in position on the terminal 20. The cable 196 is received in a receptacle 197 in the flat portion 95 of the electronics assembly 74. An adjacent receptacle 199 receives a cable from the magnetic stripe reader 66. If desired, the post 46 may be replaced by a short post 200, having upwardly extending tongues 202 and a threaded portion 204 for engagement with the aperture 171 in the plate 50.

While the forms of the invention illustrated and described herein are particularly adapted to fulfill the objects aforesaid, it is to be understood that other and further modifications within the scope of the appended claims may be made without departing from the spirit of the invention.

What is claimed is:

1. An electronic terminal device comprising:
   a combined base and wall structure for said terminal device, said wall structure including two side walls, a front wall and a rear wall, said side walls each having an inclined portion extending upwardly from said front wall to a point and a horizontal portion extending from said point to said rear wall;
   a top member positioned on the horizontal portions of the side walls and on the rear wall;
   a keyboard module positioned over the inclined portions of the side walls and over the front wall;
   a power supply having a housing positioned on said base within said terminal adjacent said rear wall;
   an electronics assembly positioned within said terminal adjacent said power supply and provided with a plurality of extensions which engage apertures in the housing of said power supply and retain said electronics assembly and said power supply in position and provide electrical connection between said power supply and said electronics assembly; and
   resilient securing means releasably retaining said electronics assembly in position on said base within said terminal device.

2. The electronic terminal device of claim 1 in which said plurality of extensions comprise a pair of metal ears on said electronics assembly which engage respective metal surfaces within the apertures in said power supply housing.

3. The electronic terminal device of claim 1 in which said resilient securing means comprises a resilient latch on said base which engages an angled extension of said electronics assembly.

4. The electronic terminal device of claim 3 in which said resilient securing means also comprises a plurality of fixed retainers mounted on said base.

5. The electronic terminal device of claim 4 in which said fixed retainers include inclined cam surfaces for urging said electronics assembly into position during assembly.

6. The electronic terminal device of claim 1 in which one of said side walls includes a removable segment, the upper surface of which comprises one of said inclined portions.

7. The electronic terminal device of claim 6, also including resilient securing means for retaining said removable segment in position.

8. The electronic terminal device of claim 1, in which said top member is secured in position on the side and rear walls of said wall structure by cooperating separable hinge means on the rear edge of said top member and on said rear wall and by latch elements on the underside of said top member which engage keeper members on the inside of said side walls.

9. The electronic terminal device of claim 8 in which said hinge means includes projections on said top member and cooperating slots on said rear wall.

10. The electronic terminal device of claim 1, also including a display device and means mounting said display device on said top member of said terminal device.

11. The electronic terminal device of claim 10 in which said mounting means includes a slotted circular aperture in said top member, a display base having projections which fit within the slots of said aperture, said display base being rotatable after insertion into said aperture for locking in place, and means for securing said display device to said base.

12. The electronic terminal device of claim 11, in which said securing means comprises tabs on an upper portion of said base and complementary slots on a lower portion of said display device.

13. The electronic terminal device of claim 1, also including at least one access door in said base and resilient means for releasably retaining said access door in position.

14. The electronic terminal device of claim 13 in which said resilient means comprise snap connection means.

15. The electronic terminal device of claim 1, also including a plurality of feet attached to said base by snap connection means.

16. The electronic terminal device of claim 1 in which said electronics assembly also includes a metal housing for containing certain electronic components.

17. The electronic terminal device of claim 10 in which said top member also includes a first removable door and snap connection means for retaining said door in position, said door being removable for the addition of a second display device to said terminal device.

18. The electronic terminal device of claim 17, also including a second removable door having an aperture therein and snap connection means therefor which may be inserted in said top member in place of said first removable door, a second display device, a post for carrying said second display device and a connector for receiving said post, said connector being received in said aperture in said second door for mounting said second display device on said electronic terminal device.

19. The electronic terminal device of claim 18 in which said post comprises two complementary elements having snap connections.

20. The electronic terminal device of claim 1 in which said combined base and wall structure and said top member are of resilient plastic material and in which securing means for securing said top member to said combined base and wall structure are formed integral with said top member and said combined base and wall structure.

21. An electronic terminal device comprising:
a combined base and wall structure for said terminal device, said wall structure including two side walls, a front wall and a rear wall, said side walls each having an inclined portion extending upwardly from said front wall to a point and a horizontal portion extending from said point to said rear wall;
a top member positioned on the horizontal portions of the side walls and on the rear wall;
a keyboard module positioned over the inclined portions of the side walls and over the front wall;
a power supply having a housing positioned on said base within said terminal adjacent said rear wall;
an electronics assembly positioned within said terminal adjacent said power supply and provided with a pair of metal ears which engage respective metal surfaces of said power supply housing and retain said electronics assembly and said power supply in position and provide electrical connection between said power supply and said electronics assembly, said electronics assembly also including an angled projecting extension from a side of said assembly remote from said power supply;
a resilient latch on said base which engages said angled projecting extension and holds said electronics assembly and said power supply in position on said base; and
a plurality of fixed retainers mounted on said base adjacent to said resilient latch, said retainers including inclined cam surfaces urging said electronics assembly into proper position on said base during assembly of said electronic terminal device.

* * * * *